United States Patent
Araki et al.

(10) Patent No.: US 7,191,730 B2
(45) Date of Patent: Mar. 20, 2007

(54) DISPLAYING INSTRUMENT AND LUMINOUS POINTER

(75) Inventors: Teruaki Araki, Kariya (JP); Ichiro Sugiura, Hekinan (JP)

(73) Assignee: DENSO Corporation, Kariya (JP)

( * ) Notice: Subject to any disclaimer, the term of this patent is extended or adjusted under 35 U.S.C. 154(b) by 15 days.

(21) Appl. No.: 11/137,781

(22) Filed: May 26, 2005

(65) Prior Publication Data

US 2005/0268839 A1 Dec. 8, 2005

(30) Foreign Application Priority Data

May 27, 2004 (JP) .............................. 2004-157706

(51) Int. Cl.
*G12B 11/04* (2006.01)

(52) U.S. Cl. ................ 116/288; 116/62.1; 116/DIG. 6; 340/815.78; 362/26

(58) Field of Classification Search ............... 116/62.1, 116/62.4, 284, 286, 287, 288, DIG. 5, DIG. 6, 116/DIG. 26, DIG. 36; 340/441, 660, 662, 340/688, 691.1, 691.8, 815.42, 815.45, 815.78; 362/23, 26, 27, 551, 555, 612, 613, 623, 362/625, 626
See application file for complete search history.

(56) References Cited

U.S. PATENT DOCUMENTS

| | | | | |
|---|---|---|---|---|
| 5,636,589 A * | 6/1997 | Kato et al. | .................. | 116/286 |
| 5,669,693 A * | 9/1997 | Smith | .......................... | 362/511 |
| 6,004,001 A * | 12/1999 | Noll | ............................ | 362/30 |
| 6,082,288 A * | 7/2000 | Kato et al. | ................... | 116/286 |
| 6,152,570 A * | 11/2000 | Yokoyama | ................... | 362/613 |
| 6,305,813 B1* | 10/2001 | Lekson et al. | ............. | 362/625 |
| 6,367,957 B1* | 4/2002 | Hering et al. | ............... | 362/511 |
| 6,655,209 B2 | 12/2003 | Wada et al. | .................. | 73/491 |
| 6,948,840 B2* | 9/2005 | Grenda et al. | ............. | 362/555 |
| 2004/0196667 A1* | 10/2004 | Lea | ............................ | 362/583 |
| 2005/0268839 A1* | 12/2005 | Araki et al. | ................ | 116/288 |

FOREIGN PATENT DOCUMENTS

| JP | 06082274 A | * | 3/1994 |
|---|---|---|---|
| JP | 07167683 A | * | 7/1995 |
| JP | 10332438 A | * | 12/1998 |
| JP | 2003035573 A | * | 2/2003 |

* cited by examiner

*Primary Examiner*—R. Alexander Smith
(74) *Attorney, Agent, or Firm*—Posz Law Group, PLC

(57) ABSTRACT

A luminous pointer of a displaying instrument has a pointer body with a light emitting area that is divided into subsections with prisms. The subsections are illuminated at different timing. A light emitting circuit, including light emitting diodes (LEDs) for illuminating the light emitting area, and resistors and zener diodes for driving the LEDs, is arranged in a boss of the pointer body. With this configuration, an increase in weight of the pointer body, especially at a tip of the pointer body, is less likely to occur.

22 Claims, 10 Drawing Sheets

US 7,191,730 B2

DISPLAYING INSTRUMENT AND LUMINOUS POINTER

CROSS REFERENCE TO RELATED APPLICATION

This application is based on and incorporates herein by reference Japanese Patent Application No. 2004-157706 filed on May 27, 2004.

FIELD OF THE INVENTION

The present invention relates to a displaying instrument having a luminous pointer, illumination areas of which are adjustable.

BACKGROUND OF THE INVENTION

An automotive meter having an illuminated pointer is proposed in U.S. Pat. No. 6,655,209. The pointer is structured so that it is observed as if its illuminated length is altered according to on/off conditions of a key switch. A cross-sectional view of the meter is shown in FIG. 10 and a circuit diagram of its light emitting circuit for the pointer is shown in FIG. 11.

The pointer 100 has a printed circuit board (PCB) 101 in its longitudinal direction, and light emitting diodes (LEDs) 102a through 102j are arranged on a surface of the PCB 101 at regular intervals. Resistors 103a through 103j and zener diodes 104a through 104j are arranged on the other surface of the PCB 101 at locations corresponding to relative LEDs 102a–102j. A terminal 106 is extended from the PCB 101 on a side adjacent to a boss. A voltage is applied to the LEDs 102a–102j, the resistors 103a–103j, and the zener diodes 104a–104j via the terminal 106.

In the light emitting circuit, the resistors 103a–103j and the zener diodes 104a–104j are connected in series with the respective LEDs 102a–102j. Each series connection is connected in parallel with other series connections. A saturation voltage of each zener diode 104a–104j are set so that the diodes 104a–104j are lined according to levels of the saturation voltages that vary from low to high as they go away from the boss side.

The pointer 100 is illuminated by applying a voltage, a level of which becomes higher as elapsed time becomes longer as shown in FIG. 12, to end terminals 107a, 107b of the light emitting circuit via the terminal 106. The LED 102a is illuminated at time t1 at which the zener diode 104a is saturated and the LED 102b is illuminated at time t2 at which the zener diode 104b is saturated. The LEDs 102a–102j are illuminated in sequence from the boss side to the other as time passes. With this configuration, the pointer 100 is observed as if it stretches from its base portion to its tip.

In this meter, a number of LEDs 102a–102j, the resistors 103a–103j, and the zener diodes 104a–104j are fixed to the pointer 100 throughout its length. Thus, the pointer 100 becomes heavy in weight, especially at its tip, and an inertia moment of the pointer 100 increases. Moreover, the barycentric point moves toward the tip and the unbalanced weight increases. Therefore, high-performance movement for rotating the pointer 100 is required, and an application of this meter to an actual instrument is difficult.

SUMMARY OF THE INVENTION

The present invention therefore has an objective to provide a displaying instrument having a luminescent pointer, a tip of which is light in weight, and an increase in inertial moment, a shift of a barycentric point of the pointer toward the tip, and the unbalanced weight are less likely to occur. A displaying instrument of the present invention includes a luminous pointer having a boss and pointer body. The boss is held with an end of a pointer shaft of a movement. It houses light sources for illuminating the pointer, and a light emitting circuit for driving the light sources. The pointer body is made of light guiding material and held with the pointer shaft via the boss. It points an appropriate mark on a dial plate.

Light is emitted from the light sources driven by the light emitting circuit and guided toward a tip of the pointer body. Then, the light is outputted through an light emitting area, which is a surface of the pointer body. The pointer body has multiple subsections such that the light emitting area is sectioned in a boss-to-tip direction, and the subsections are illuminated at different timing by the respective light sources.

The light sources and the light emitting circuit are centrally arranged in the boss rather than the pointer body. Thus, an increase in inertial moment, a shift of a barycentric point of the pointer toward the tip, and the unbalanced weight due to an increase in weight of the pointer body are less likely to occur. Furthermore, the subsections of the pointer body can be illuminated in sequence from the boss side to the tip side, and extinguished in sequence from the tip side to the boss side.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

Figure 1:
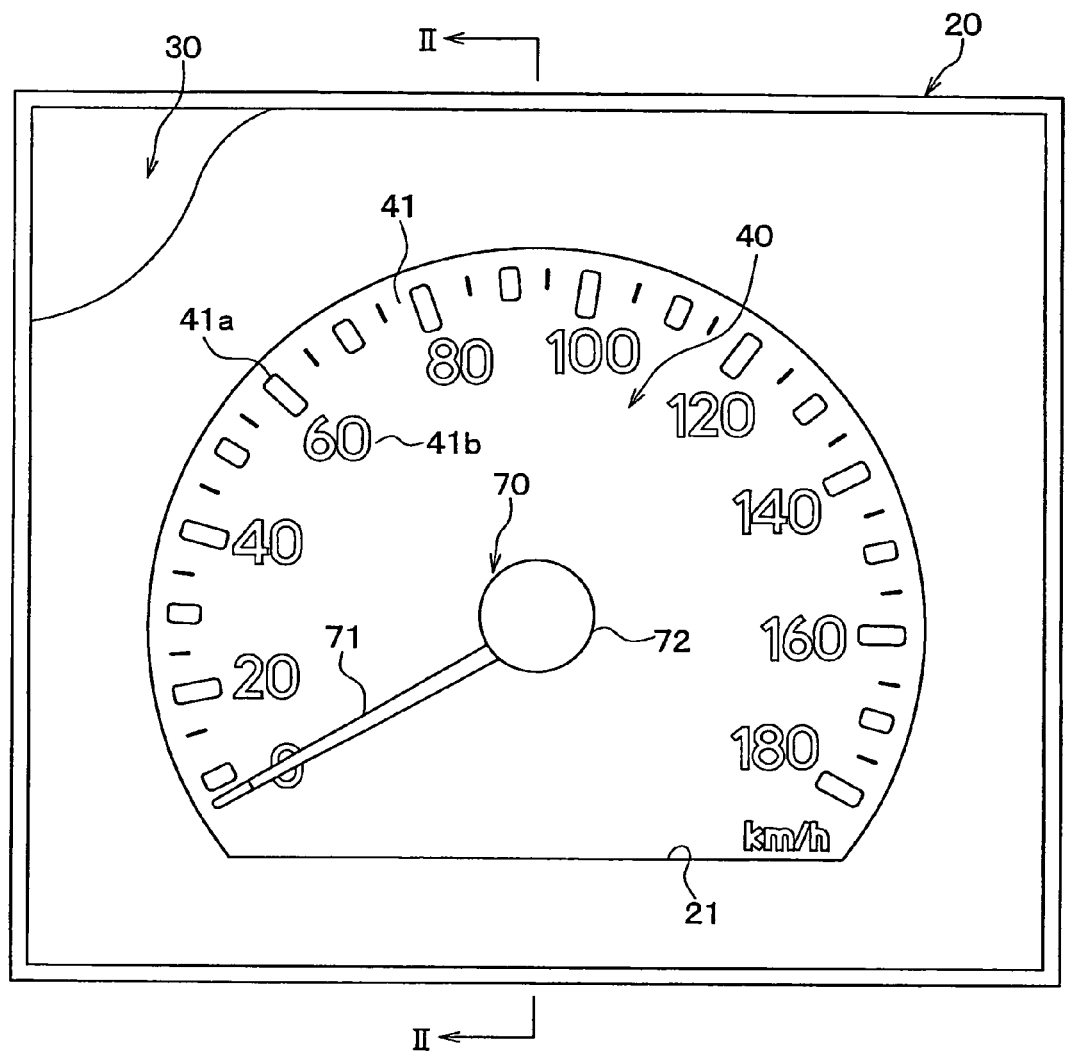
FIG. 1 is a front view of a speedometer according to the first embodiment of the present invention.

The preferred embodiments of the present invention will be explained with reference to the accompanying drawings. In the drawings, the same numerals are used for the same components and devices.

First Embodiment

Figure 2:
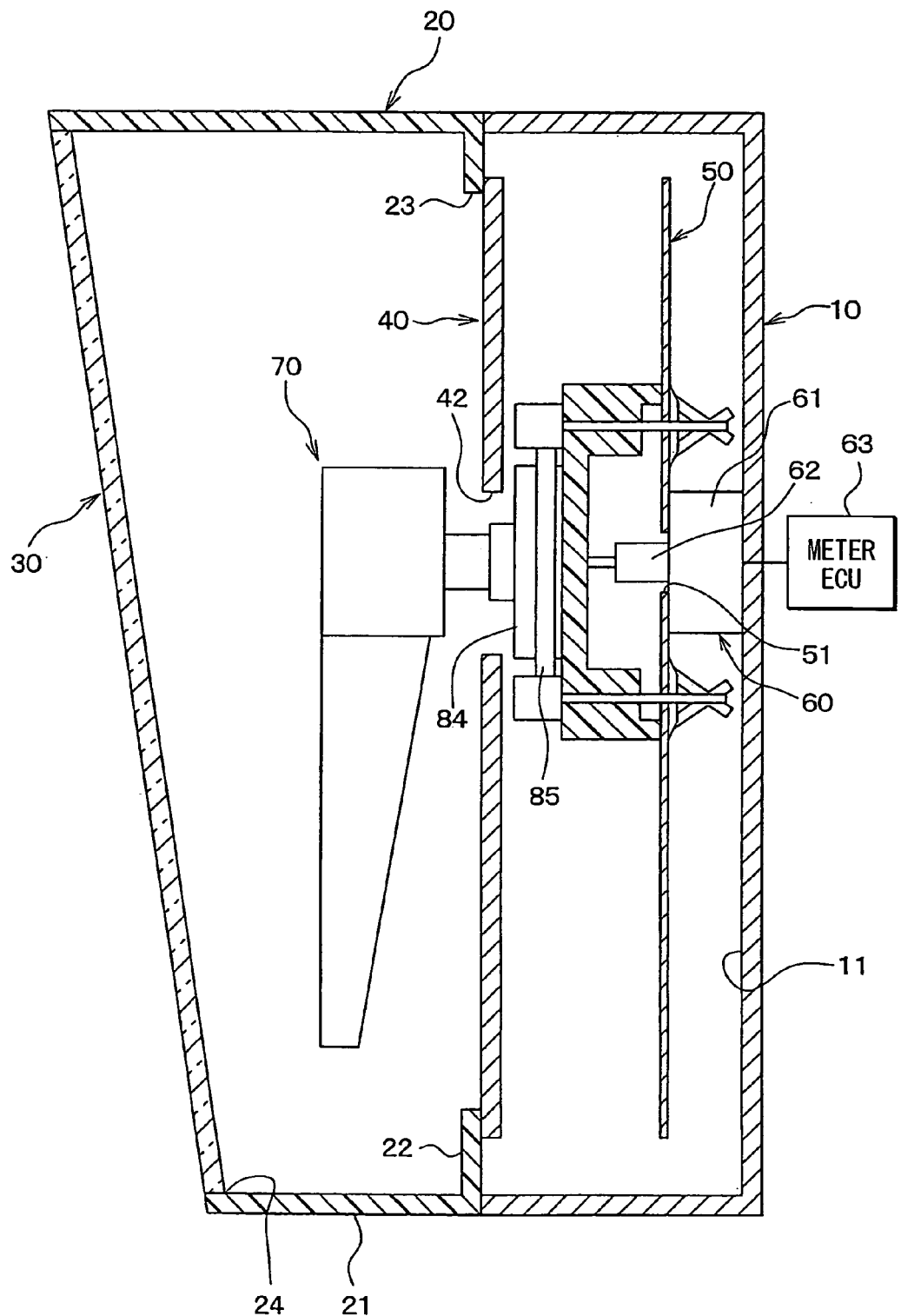
FIG. 2 is a cross-sectional view of the speedometer sectioned with the II—II line in FIG. 1 according to the first embodiment.

A displaying instrument having a luminous pointer applied to a speedometer will be discussed. A front view of the speedometer is shown in FIG. 1 and a cross-sectional view of the speedometer sectioned by the II—II line in FIG. 1 is shown in FIG. 2. Referring to FIGS. 1 and 2, a speedometer includes a case 10, a hood 20, a front panel 30, a dial plate 40, a circuit board 50, a movement 60, and a luminous pointer 70. The case 10, the hood 20, and the front panel 30 form a housing, and the dial plate 40, the circuit board 50, the movement 60, and the pointer 70 are assembled to the housing.

The case 10 has a U-shaped cross-section and the movement 60 is fixed to the case 10 at a position corresponding a base of the U. The hood 20 formed in a frame-shape has a surrounding wall 21 and a base wall 22. The base wall 22 has a rear opening 23 for the dial plate 40 and the luminous pointer 70 to be viewed from the front. The front panel 30 provided as a black face having about 20% of light transmission is fitted in a front opening 24. The dial plate 40 has a scale portion 41 in which marks 41a and characters 41b are arranged substantially in a form of an arc. More specifically, the marks 41a are arranged along a rim of the dial plated 40 for indicating speeds of a vehicle between a minimum speed (0 km/h) and a maximum speed (180 km/h). The characters 41b are arranged at corresponding positions to the marks 41a for providing numerical values of the speeds.

The circuit board 50 is arranged in the rear of the dial plate 40 inside the case 20. It is held with an end of a main body of the movement 60. A voltage is applied to a light emitting circuit via a control unit (not shown) mounted on the circuit board 50 for illuminating the pointer 70. The movement 60 has the main body 61 and a pointer shaft 62. The main body 61 is fixed to a base portion 11 of the case 10 inside the case 10. The pointer shaft 62 is arranged such that it is rotatable and it extends from the main body 61 to a through-hole 42 of the dial plate 40 via a through-hole 51 of the circuit board 50. The movement 60 is electrically connected with a meter electronic control unit (ECU) 63 installed in the vehicle for receiving driving signals produced based on vehicle speeds from the ECU 63. The vehicle speeds are calculated from signals outputted from a speed sensor. The movement 60 is driven based on the driving signals. The pointer 70 is held with the end of the pointer shaft 62, and rotated according to rotation of the pointer shaft 62 along the scale portion 41. It points the marks 41a for indicating the vehicle speeds.

Figure 3A:
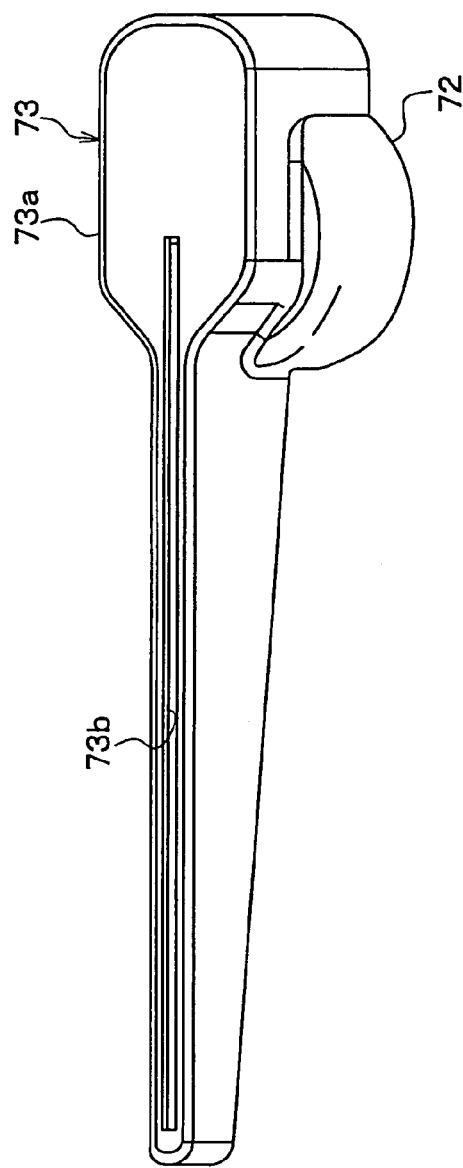
FIG. 3A is a perspective view of a luminescent pointer of the speedometer according to the first embodiment.
Figure 3B:
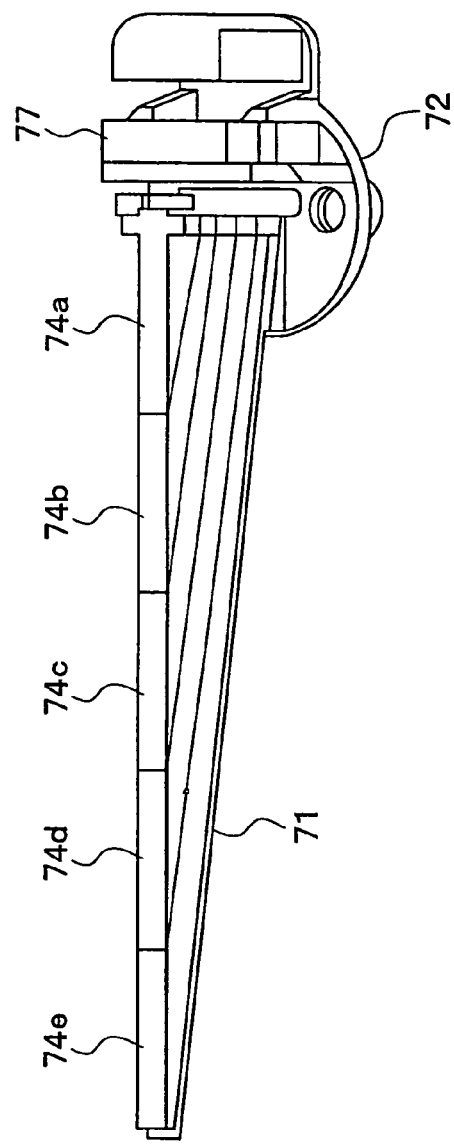
FIG. 3B is a perspective view of the luminescent pointer without a cover according to the first embodiment.
Figure 4:
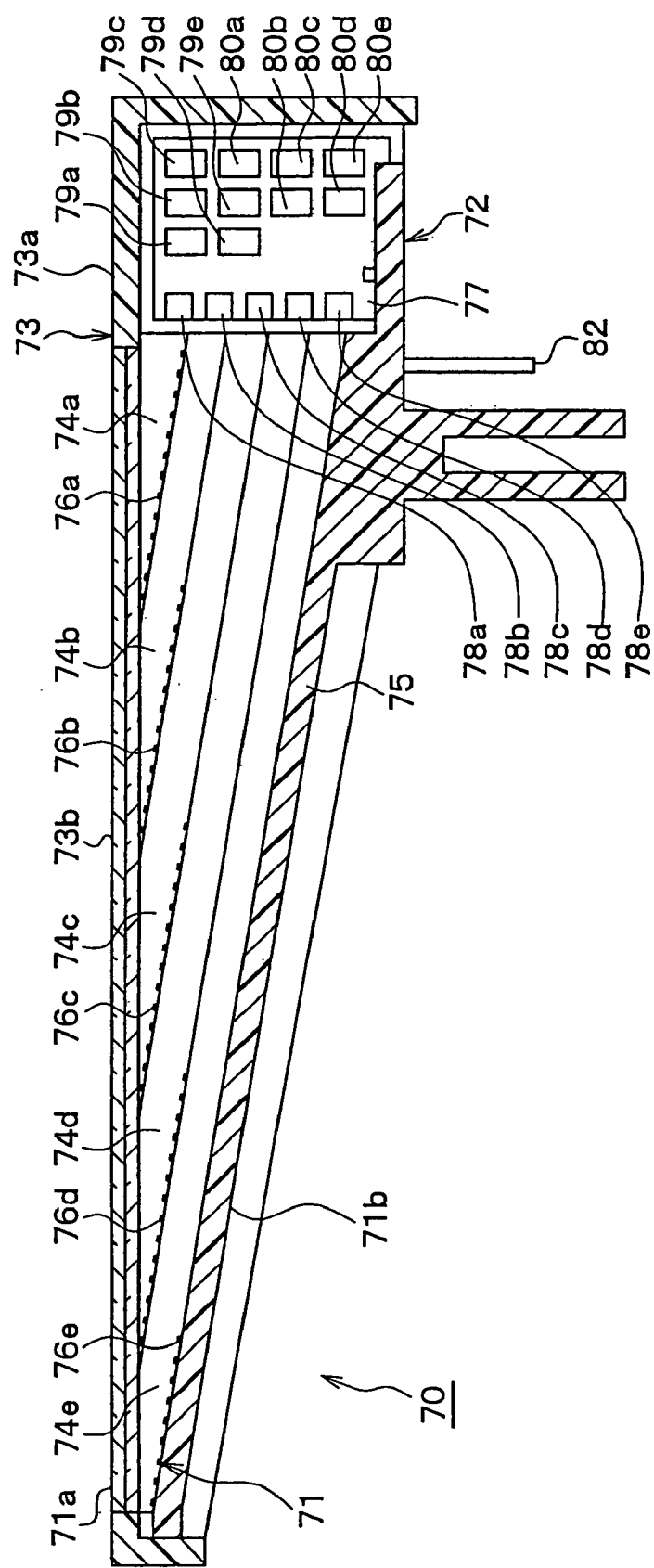
FIG. 4 is an enlarged cross-sectional view of the luminescent pointer according to the first embodiment.

Referring to FIG. 3A, the pointer 70 as a pointer body 71, a boss 72, and a cover 73. The pointer body 71 and the boss 72 is covered with the cover 73. The pointer 70 without the cover 73 is shown in FIG. 3B. The pointer body 71 is held with the end of the pointer shaft 62 at the boss 72 with the same axis. The pointer body is rotated with the boss 72 when the pointer shaft 62 is rotated. Most o part of the cover 73 is made of opaque material, and referred to as an opaque portion 73a. A part of the top surface of the cover 73 is made of translucent material in the longitudinal direction of the pointer body 71, and referred to as an translucent portion 73b. A driver can see light outputted from the translucent portion 73b and passed through the front panel 30 when the pointer body 71 is illuminated.

The pointer body 71 is formed such that a top surface 71a is parallel to the top surface of the dial plate 40 and a rear surface 71b is angled with respect to the top surface of the dial plate 40. Namely, the rear surface 71b angled with respect to a longitudinal axis of the pointer body 71. Thus, the pointer body 71 is tapered. The pointer body 71 includes the first, the second, the third, the fourth, and the fifth prisms 74a–74e, which are made of light guiding material, such as acrylic. The prisms 74a–74e are arranged on top of each other so that the pointer body 71 is formed into the tapered shape. The number of the prisms 74a–74e is not limited to five as in this embodiment.

The prisms 74a–74e are shaped so that the second ends of the prisms 74a–74e are on the same plane when their longitudinal axes are arranged with their longitudinal axis aligned in the longitudinal direction of the rear surface 71b of the pointer body 71. Moreover, the prism 74a–74e are shaped so that their first ends on the boss side are exposed, and the second ends are parallel to the front surface 71a of the pointer body 71. Namely, the prisms 74a–74e are shaped such that their surfaces are angled with respect to the longitudinal axis of the pointer body 71. The pointer 70 is assembled by sandwiching the prisms 74a–74e between the pointer body 71, a base portion 75 of the boss 72, and the cover 73. The surfaces of the prisms 74a–74e at the second ends form a light emitting area, and each of the second end corresponds to a subsection of the light emitting area.

The prisms 74a–74e are piled up without bonding so that boundaries between the prisms 74a–74e are defined. As a result, light entering one of the prisms 74a–74e is less likely to enter the other prisms 74a–74e. Light diffusion layers 76a–76e are formed in the prisms 74a–74e by whole area printing or halftone dot printing. Each light diffusion layers 76a–76e are formed in a part of each rear surface between an area opposed to the tip of the prism 74a–74e and an area opposed to the tip of the adjacent prism 74a–74e. The light diffusion layers 76a–76e horizontally overlaps each other in the longitudinal direction of the pointer body 71.

The light circuit board 77 is installed on a circuit board 77 and the circuit board 77 is housed in the boss 72. The first, the second, the third, the fourth, and the fifth LEDs 79a–79e are mounted on the circuit board 77 for emitting light toward the first, the second, the third, the fourth, and the fifth prisms 74a–74e, respectively. The first, the second, the third, the fourth, and the fifth resistors 79a–79e and the first, the second, the third, the fourth, and the fifth zener diodes 80a–80e are mounted on the circuit board 77 for the respective LEDs 79a–79e. The circuit board 77 are fixed to the base portion 75 such that the LEDs 78a–78e are parallel to an end wall of the pointer body 71 located on the boss side and faces the respective prisms 74a–74e.

Figure 5:
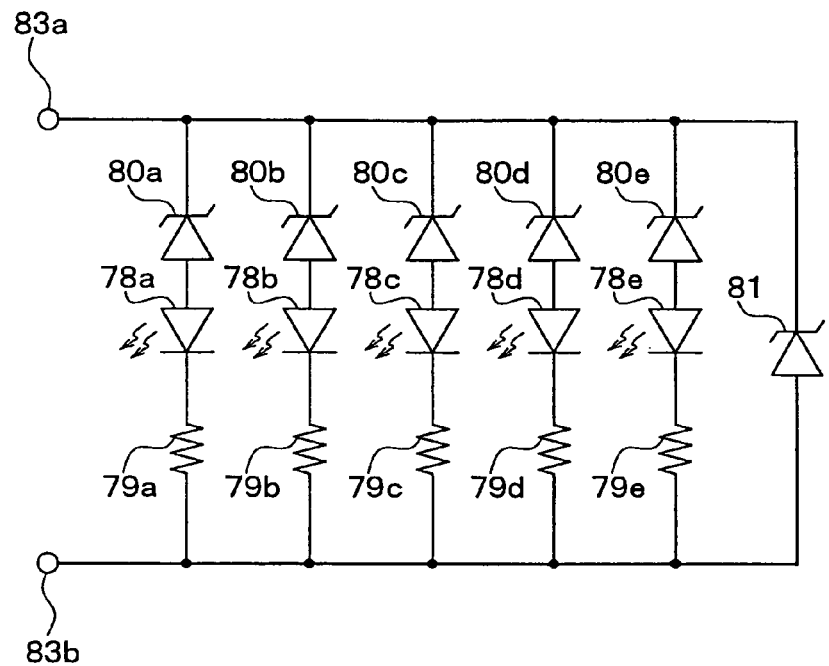
FIG. 5 is a circuit diagram of a light emitting circuit included in the speedometer according to the first embodiment.

The light emitting circuit is shown in FIG. 5. The LEDs 78a–78e, the resistor 79a–79e, and the zener diode 80a–80e are connected in series, respectively. Lines of the LEDs 78a–78e, the resistors 79a–79e, and the zener diodes 80a–80e are connected in parallel with each other. A zener diode 81 is connected in parallel with the lines for overvoltage protection. Voltages higher than a saturation voltage of the zener diode 81 are not applied to each line.

Saturation voltages of the zener diodes 80a–80e are determined such that the saturation voltages gradually increase from the first zener diode 80a to the fifth zener diode 80e. Namely, the saturation voltage of the first zener diode 80a is the lowest and that of the fifth zener diode 80e is the lowest. Resistances of the resistors 79a–79e are determined so that currents passing through the lines become about equal.

A terminal 82 pulled out of the boss 72 is connected to a rotation terminal 84, and a flexible printed circuit board (FPC) 85 is stored in the rotation terminal 84 in a spiral fashion. The light emitting circuit is electrically connected with the circuit board 50 via the FPC 85. The FPC 85 absorbs rotation movements of the rotation terminal 84 and the pointer 70, and the electrical connection with the circuit board 50 is secured. With this configuration, components of the light emitting circuit start driving based on driving signals from a meter electronic control unit (ECU) 63 for controlling illumination of the pointer 70.

Figure 6:
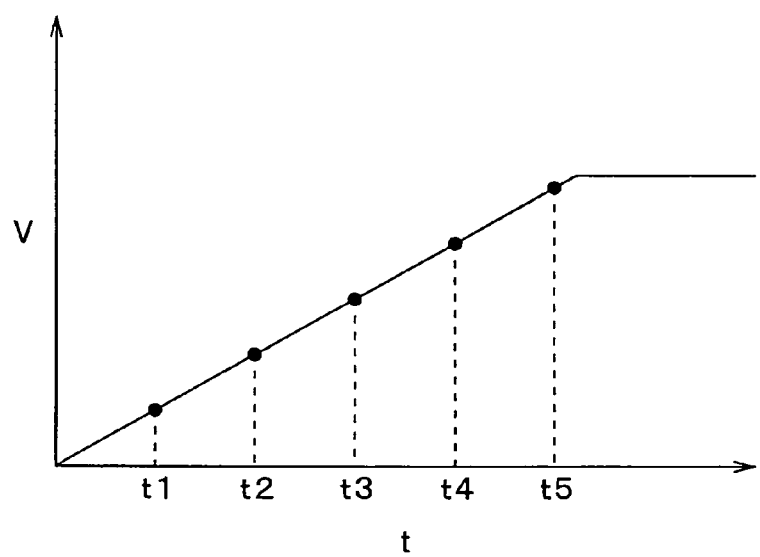
FIG. 6 is a waveform of a application voltage to the light emitting circuit according to the first embodiment.

Power supply to the meter ECU 63 starts when an ignition switch (not shown) is turned on. The driving signal is outputted from the meter ECU 63 based on a sensor signal from the speed sensor, and the movement 60 is driven. As a result, the speedometer starts operating. A voltage that increases as time t becomes longer as shown in FIG. 6 is applied to terminals 83a, 83b of the light emitting circuit via the terminal 82. As a result, the LEDs 78a–78e start emitting light in sequence. More specifically, the zener diode 80a is saturated at time t1 and the LED 78a starts emitting light. The zener diode 80b is saturated at time t2 and the LED 78b starts emitting light. In the same manner, the LEDs 78c–78e start emitting light in sequence from the boss side as time t passes.

The light emitted from the LEDs 78a–78e enters the prisms 74a–74e from their first ends in sequence. The entered light is guided from the first ends to the second ends because the prisms 74a–74e are made of light guiding material. Then, the light is diffused by the light diffusion layer 76a–76e, and lead to the outside of the pointer 70 via the translucent portion 73b. The driver can see the illuminated light through the front panel 30.

The LEDs 78a–78e emit light in sequence as the course of time, and the light enters the prisms 74a–74e in sequence. Thus, the driver sees the pointer 70 as is it extends from the base on the boss side toward the tip. Namely, the pointer 70 can provide innovative looking to the driver. The voltage V applied to the light emitting circuit is gradually reduced when the ignition switch is turned off. As a result, the LEDs 78a–78e are extinguished in opposite sequence, that is, from the fifth LED 78e to the first LED 78a, and the driver sees the pointer 70 as if it shrinks from the tip to the base.

The light emitting area of the pointer body 71 is divided into multiple subsections with the prisms 74a–74e. Each subsection can be illuminated at different timing, namely, each subsection can be independently illuminated. The components of the light emitting circuit, including LEDs 78a–78e, the resistors 79a–79e, and the zener diodes 80a–80e, are arranged in the boss 72. Therefore, extra weight is less likely to be applied to the pointer body 71, especially, to the tip of the pointer body 71. With this configuration, an increase in inertia moment, a shift of a barycentric point of the pointer body 71 toward the tip, and the unbalanced weight are less likely to occur.

The light emitting area is formed with the prisms 74a–74e, namely, a relatively large area can be illuminated by each prism 74a–74e. Thus, only a smaller number of LEDs is required for Illuminating the pointer 70 with respect to the related art. The cost for parts, power consumption, and heat production by the LEDs 78a–78e can be reduced in comparison to the related art. Moreover, the pointer body 71 is divided into subsections with the prisms 74a–74e and the light is diffused by the light diffusion layers 76a–76e. Thus, light is more likely to be evenly seen by the driver.

Second Embodiment

Figure 7:
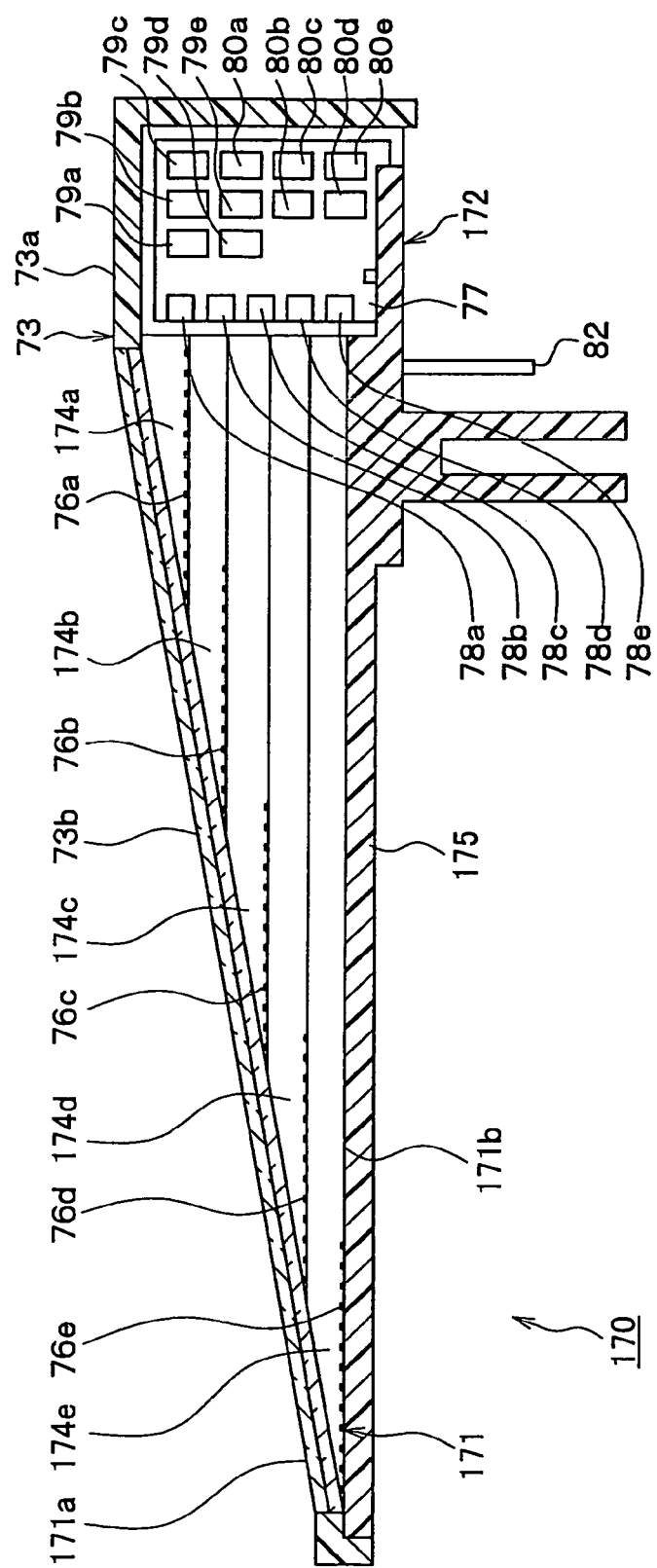
FIG. 7 is an enlarged cross-sectional view of a luminescent pointer according to the second embodiment.

Referring to FIG. 7, a pointer body 171 of a luminous pointer 170 is formed such that a top surface 171a is sloped with respect to the top surface of the dial plate 40 and a rear surface 171b is parallel to the top surface of the dial plate 40. With this configuration, the same effects as the first embodiment can be produced. Prisms 174a–174e are arranged such that their bottom surfaces are parallel to a bottom surface 171b of the pointer body 171. The first ends of the prisms 174a–174e are exposed on the boss side, and the second ends of the prisms 174a–174e are shaped at angles to become parallel to the top surface 171a. The second ends are on the same plane, and the pointer 170 is assembled by sandwiching the prisms 174a–174e between the pointer body 171, a base portion 175 of a boss 172, and the cover 73.

Third Embodiment

Figure 8:
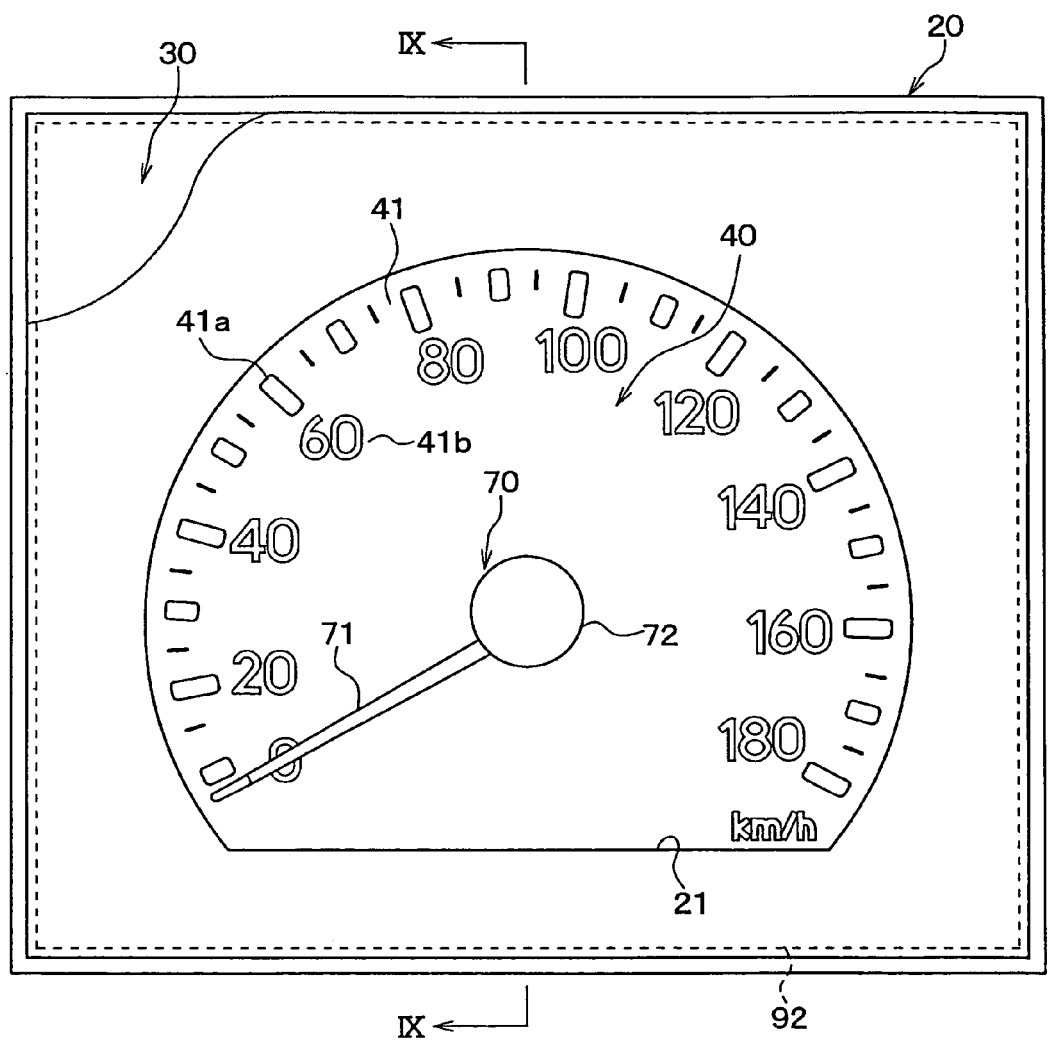
FIG. 8 is a front view of a speedometer according to the third embodiment of the present invention.
Figure 9:
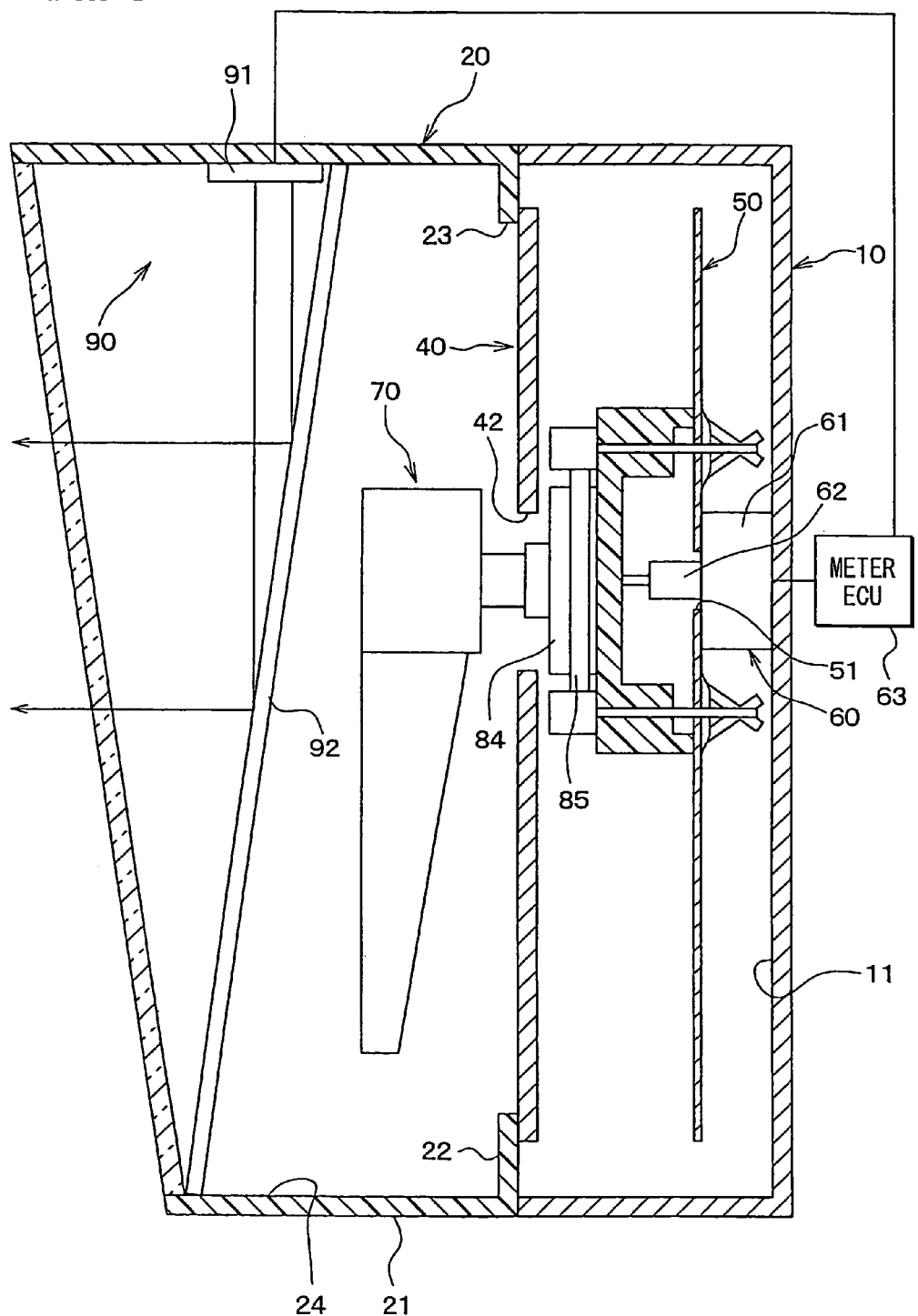
FIG. 9 is a cross-sectional view of the speedometer sectioned by the IX—IX line in FIG. 8 according to the third embodiment.
Figure 10:
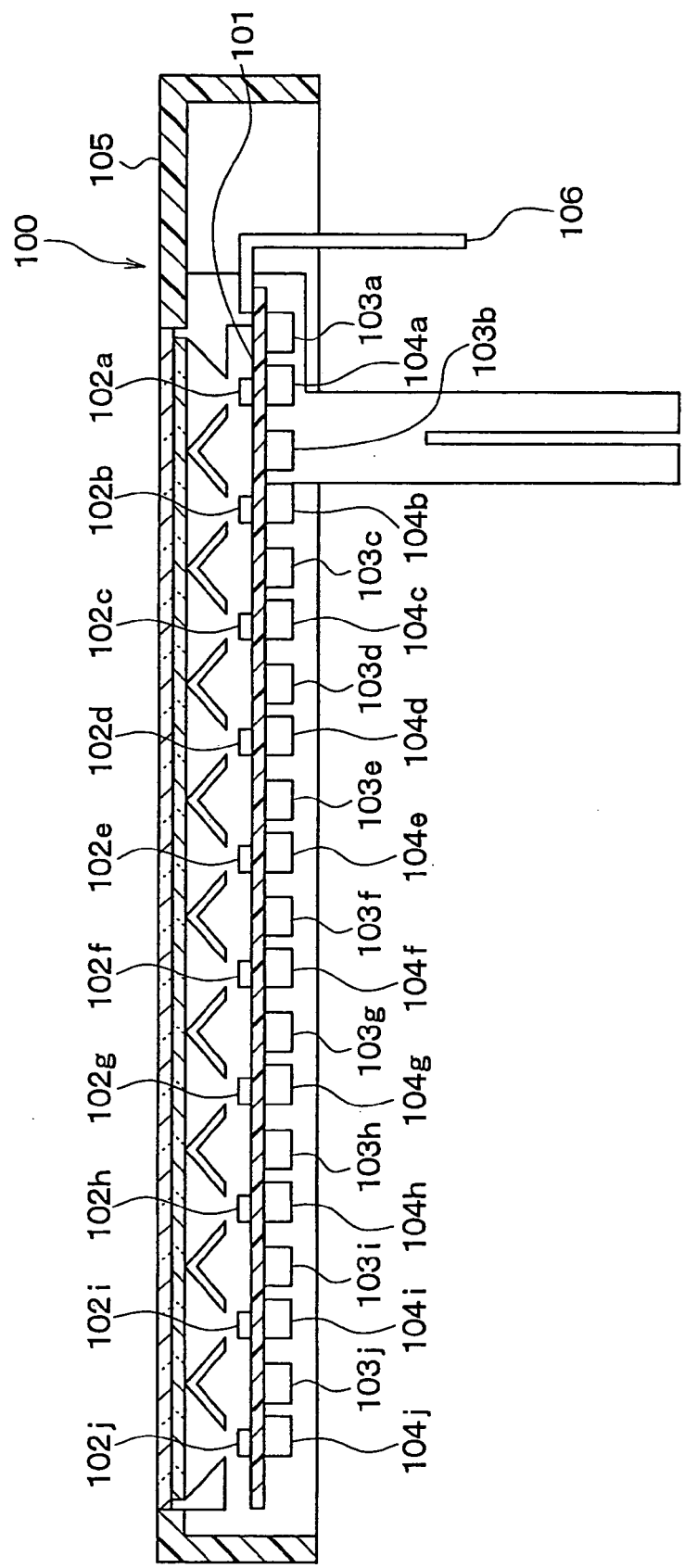
FIG. 10 is a cross-sectional view of a luminescent pointer of a vehicular instrument according to the related art.
Figure 11:
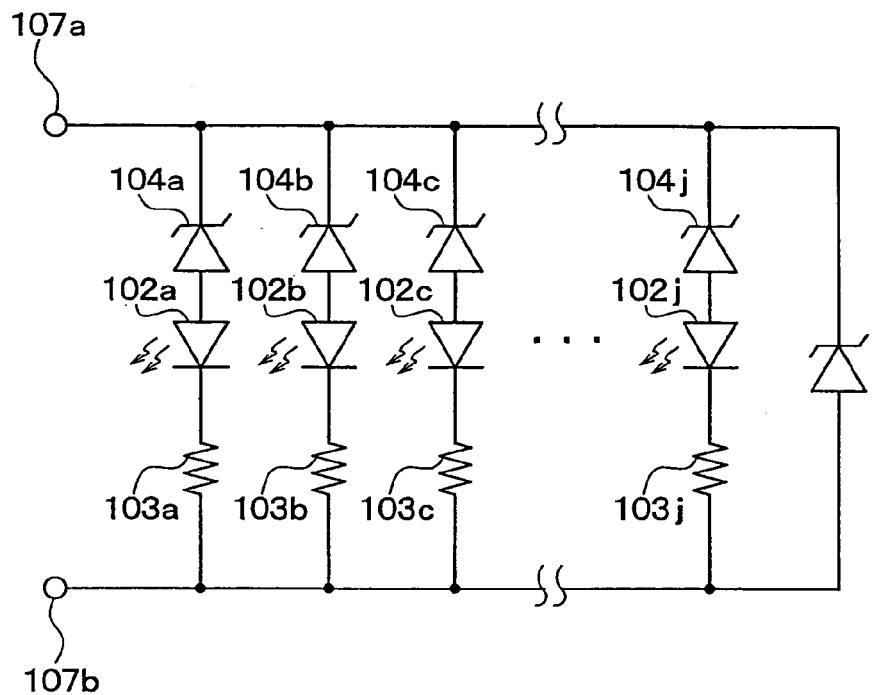
FIG. 11 is a circuit diagram of a light emitting circuit for the pointer according to the related art.
Figure 12:
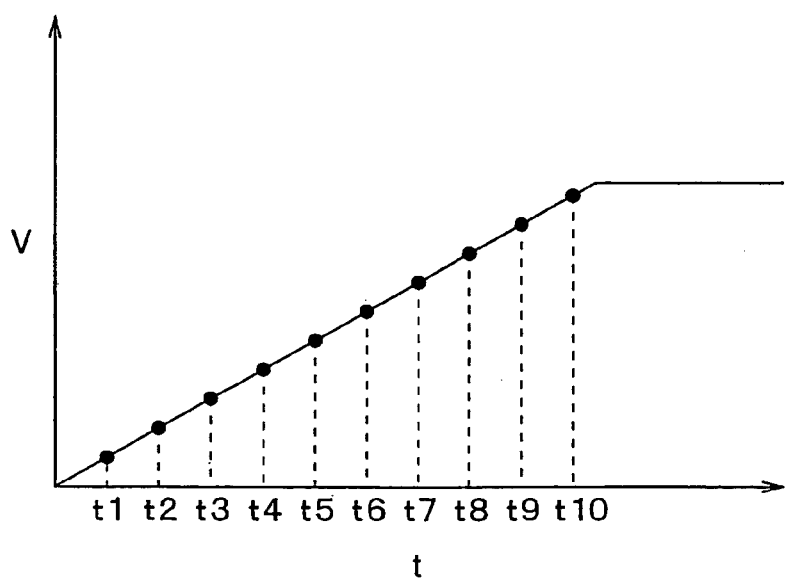
FIG. 12 is a waveform of an application voltage to the light emitting circuit according to the related art.

A front view of a speedometer is shown in FIG. 8, and a cross-sectional view of the speedometer sectioned by the IX—IX line in FIG. 8. The speedometer includes a display unit 90 having a display screen 91 for displaying information and semi-reflecting semi-transparent half mirror 92 for reflecting contents of the information displayed on the screen 91. Information is displayed on the display screen 91 through control performed by the meter ECU 63. The contents of the information are reflected by the half mirror 92 so that the driver can see them. A light emitting circuit randomly drives the LEDs 78a–78e, for example, by turning on and off the LEDs 78a–78e with switching components.

The contents of the information may not be easily seen by the driver when they overlaps with the pointer 70. Thus, the pointer 70 is not illuminated in areas that overlaps with areas in which contents of information are reflected by the half mirror 92 when the contents are displayed. For example, the LEDs 78a and 78b are not turned on and the LEDs 78c–78e are turned on when an area indicated with alternate long and short dashed lines in FIG. 8 when the contents are displayed. With this configuration, the driver can easily see a speed indication by the pointer 70 and the display screen 90.

The present invention should not be limited to the embodiment previously discussed and shown in the figures, but may be implemented in various ways without departing from the spirit of the invention. For example, the zener diode 80a may be removed from the light emitting circuit.

What is claimed is:

1. A displaying instrument comprising:
   a dial plate on which marks indicating values between a lowest value and a highest value are arranged in a form of an arc and having a through-hole at a center of the arc of the marks;
   a movement arranged in a rear of the dial plate and having a pointer shaft; and
   a luminous pointer held with an end of the pointer via the through-hole and driven by the movement, wherein
   the luminous pointer rotates along the marks and points to an appropriate mark,
   the luminous pointer has a boss that is held with the end of the pointer shaft and a pointer body that is made of light guiding material and held with the end of the pointer shaft via the boss, the boss houses a plurality of light sources and a light emitting circuit that drives the light sources, the light emitting circuit drives the light sources to emit light, the light emitted from the light sources are guided toward a tip of the pointer body and outputted to an outside of the pointer body through a surface of the pointer body such that the surface is illuminated, the surface being a light emitting area, and the pointer body has a plurality of subsections such that the light emitting area is sectioned in a boss-to-tip direction and the subsections are illuminated at different timing by the respective light sources.

2. The displaying instrument according to claim 1, wherein the subsections are illuminated in sequence from a boss side to a tip side when a voltage that increases as a lapse of time is applied to the light emitting circuit.

3. The displaying instrument according to claim 2, wherein:

the light emitting circuit includes zener diodes;

the light sources are connected to the respective zener diodes in series forming lines;

the lines of the light sources and the zener diodes are connected in parallel to each other; and the zener diodes are arranged in order of levels of saturation voltages thereof such that the zener diode connected in series to the light source for illuminating the subsection adjacent to the boss has a lowest saturation voltage and the zener diode connected in series to the light source for illuminating the subsection adjacent to the tip has a highest saturation voltage.

4. The displaying instrument according to claim 2, wherein:

the light emitting circuit includes zener diodes;

the light sources are connected to the respective zener diodes in series forming lines except for the light source for illuminating the subsection adjacent to the boss;

the lines of the light sources and the zener diodes are connected in parallel to each other; and the zener diodes are arranged in order of levels of saturation voltages thereof such that the zener diode connected in series to the light source for illuminating the subsection next to the subsection adjacent to the boss has a lowest saturation voltage and the zener diode connected in series to the light source for illuminating the subsection adjacent to the tip has a highest saturation voltage.

5. The displaying instrument according to claim 1, wherein the subsections are extinguished in sequence from the tip side to the boss side when a voltage that increases as a lapse of time is applied to the light emitting circuit.

6. The displaying instrument according to claim 5, wherein:

the light emitting circuit includes zener diodes;

the light sources are connected to the respective zener diodes in series forming lines;

the lines of the light sources and the zener diodes are connected in parallel to each other; and the zener diodes are arranged in order of levels of saturation voltages thereof such that the zener diode connected in series to the light source for illuminating the subsection adjacent to the boss has a lowest saturation voltage and the zener diode connected in series to the light source for illuminating the subsection adjacent to the tip has a highest saturation voltage.

7. The displaying instrument according to claim 5, wherein:

the light emitting circuit includes zener diodes;

the light sources are connected to the respective zener diodes in series forming lines except for the light source for illuminating the subsection adjacent to the boss;

the lines of the light sources and the zener diodes are connected in parallel to each other; and the zener diodes are arranged in order of levels of saturation voltages thereof such that the zener diode connected in series to the light source for illuminating the subsection next to the subsection adjacent to the boss has a lowest saturation voltage and the zener diode connected in series to the light source for illuminating the subsection adjacent to the tip has a highest saturation voltage.

8. The displaying instrument according to claim 1, wherein the luminous pointer rotates around a center point located at the boss;

the tip of the luminous pointer is free;

the pointer body includes light guiding plates for the respective light sources; and the light guiding plates are arranged between the tip and the boss.

9. The displaying instrument according to claim 1, wherein:

the pointer body includes a plurality of prisms that are made of light guiding material and arranged on top of each other;

each of the plurality of prisms has a first end and a second end;

the first end is located on the boss side; and each of the plurality of light sources is arranged adjacent to the first end of each of the plurality of prisms such that one light source is provided for one prism, and the light emitted from each of the plurality of light sources respectively enters each of the plurality of prisms from the first end.

10. The displaying instrument according to claim 9, wherein the prisms are arranged such that the second ends thereof are on a same plane.

11. The displaying instrument according to claim 10, wherein the prisms are shaped such that surfaces thereof are angled with respect to a longitudinal axis of the pointer body.

12. The displaying instrument according to claim 10, wherein each of the plurality of prisms has a light diffusion layer at a rear surface thereof.

13. The displaying instrument according to claim 12, wherein the light diffusion layer is formed in a part of the rear surface between an area opposed to a tip of the second end and an area opposed to a tip of the adjacent prism.

14. The displaying instrument according to claim 9, wherein the prisms are piled up without bonding.

15. A displaying instrument comprising:

a dial plate on which marks indicating values between a lowest value and a highest value are arranged in a form of an arc and having a through-hole at a center of the arc of the marks;

a movement arranged in a rear of the dial plate and having a pointer shaft; and a luminous pointer held with an end of the pointer via the through-hole and driven by the movement, wherein the luminous pointer rotates along the marks and points to an appropriate mark, the luminous pointer has a boss that is held with the end of the pointer shaft and a pointer body that is made of light guiding material and held with the end of the pointer shaft via the boss, the boss houses a plurality of light sources and a light emitting circuit that drives the light sources, the light emitting circuit drives the light sources to emit light, the light emitted from the light sources are guided toward a tip of the pointer body and outputted to an outside of the pointer body through a surface of the pointer body such that the surface is illuminated, the surface being a light emitting area, and the pointer body has a plurality of subsections such that the light emitting area is sectioned in a boss-to-tip direction and each subsection is independently illuminated by the respective light sources.

16. The displaying instrument according to claim 15, wherein the luminous pointer rotates around a center point located at the boss;

the tip of the luminous pointer is free;

the pointer body includes light guiding plates for the respective light sources; and the light guiding plates are arranged between the tip and the boss.

17. The displaying instrument according to claim 15, wherein:

the pointer body includes a plurality of prisms that are made of light guiding material and arranged on top of each other;

each of the plurality of prisms has a first end and a second end;

the first end is located on the boss side; and each of the plurality of light sources is arranged adjacent to the first end of each of the plurality of prisms such that one light source is provided for one prism, and the light emitted from each of the plurality of light sources respectively enters each of the plurality of prisms from the first end.

18. The displaying instrument according to claim 17, wherein the prisms are arranged such that the second ends thereof are on a same plane.

19. The displaying instrument according to claim 18, wherein the prisms are shaped such that surfaces thereof are angled with respect to a longitudinal axis of the pointer body.

20. The displaying instrument according to claim 18, wherein each of the plurality of prisms has a light diffusion layer at a rear surface thereof.

21. The displaying instrument according to claim 20, wherein the light diffusion layer is formed in a part of the rear surface between an area opposed to a tip of the second end and an area opposed to a tip of the adjacent prism.

22. The displaying instrument according to claim 17, wherein the prisms are piled up without bonding.

* * * * *